US012006193B2

(12) United States Patent
Kishi et al.

(10) Patent No.: US 12,006,193 B2
(45) Date of Patent: Jun. 11, 2024

(54) WORK MACHINE

(71) Applicant: KOBELCO CONSTRUCTION MACHINERY CO., LTD., Hiroshima (JP)

(72) Inventors: Takuro Kishi, Hyogo (JP); Toshimitsu Takamori, Hyogo (JP); Taisuke Tsunoo, Hyogo (JP); Yoshiki Kamon, Hyogo (JP); Kenichi Terauchi, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 303 days.

(21) Appl. No.: 17/636,178

(22) PCT Filed: Aug. 28, 2020

(86) PCT No.: PCT/JP2020/032530
§ 371 (c)(1),
(2) Date: Feb. 17, 2022

(87) PCT Pub. No.: WO2021/049317
PCT Pub. Date: Mar. 18, 2021

(65) Prior Publication Data

US 2022/0297991 A1 Sep. 22, 2022

(30) Foreign Application Priority Data

Sep. 12, 2019 (JP) ................................ 2019-165955

(51) Int. Cl.
*B66D 5/26* (2006.01)
*B66D 1/16* (2006.01)

(52) U.S. Cl.
CPC ................ *B66D 5/26* (2013.01); *B66D 1/16* (2013.01)

(58) Field of Classification Search
CPC ... B66D 5/12; B66D 5/22; B66D 1/08; B66D 1/14; B66D 1/16; B66D 1/18; B66D 1/22; B66D 1/44; B66D 5/26; B66D 2700/0158
See application file for complete search history.

(56) References Cited

U.S. PATENT DOCUMENTS 3,871,714 A * 3/1975 Behrend ................. B66D 5/26 303/10
4,434,972 A * 3/1984 Charles ................... B66D 1/52 475/5
(Continued)

FOREIGN PATENT DOCUMENTS

JP 11-92089 A 4/1999
JP 2002-317802 A 10/2002
(Continued)

OTHER PUBLICATIONS

International Search Report dated Oct. 27, 2020 in PCT/JP2020/032530 filed on August 28, 2020, 2 pages

*Primary Examiner* — Michael R Mansen
*Assistant Examiner* — Nathaniel L Adams
(74) *Attorney, Agent, or Firm* — Oblon, McClelland, Maier & Neustadt, L.L.P.

(57) ABSTRACT

Provided is a work machine capable of effectively discharging air from a hydraulic circuit of a winch unit capable of applying braking to a winch drum by receiving a working oil. The work machine includes: a winch unit having a winch drum, a winch motor, a cylinder portion and a clutch portion; a hydraulic sources; a braking operating unit; a brake valve; a connecting portion; and a throttle portion. The throttle portion includes an opening having an opening diameter that is set so as to hold a pressure in a positive oil chamber for
(Continued)

generating a brake force applied to the winch drum and to discharge a working oil from the positive oil chamber.

6 Claims, 4 Drawing Sheets

(56) References Cited

U.S. PATENT DOCUMENTS

| | | | | | |
|---|---|---|---|---|---|
| 4,500,074 | A * | 2/1985 | Fox | B66D 5/26 | |
| | | | | 254/270 | |
| 4,650,163 | A * | 3/1987 | Peterson | B66D 1/08 | |
| | | | | 254/327 | |
| 6,179,271 | B1 * | 1/2001 | Yamagata | B66D 5/26 | |
| | | | | 254/365 | |
| 2014/0083806 | A1 * | 3/2014 | Miyazaki | B66D 5/26 | |
| | | | | 188/151 R | |

FOREIGN PATENT DOCUMENTS

| | | | |
|---|---|---|---|
| JP | 2016-196340 | A | 11/2016 |
| JP | 2016-222358 | A | 12/2016 |
| JP | 2016-222380 | A | 12/2016 |
| JP | 2019-189370 | A | 10/2019 |

* cited by examiner

WORK MACHINE

TECHNICAL FIELD

The present invention relates to a work machine provided with a winch unit for winding a rope.

BACKGROUND ART

In general, a work machine such as a crane includes a lower travelling body capable of performing self-travelling, an upper slewing body mounted on the lower travelling body in a slewable manner, a boom mounted on the upper slewing body in such a manner that the boom can be raised or lowered, a hook suspended from a distal end of the boom or a distal end of a jib by way of a rope, and a winch unit having a winch drum on which the rope is wound.

For example, Patent Literature 1 discloses a brake device of a winch where the brake device includes a wet multiple disc brake. The winch (winch drum) disclosed in Patent Literature 1 is mounted on an upper slewing body. Patent Literature 2 discloses a crane where a winch drum is supported by a boom.

CITATION LIST

Patent Literature

Patent Literature 1: JP 2016-222380 A

Patent Literature 2: JP 2016-222358 A

Depending on various purposes in use, there may be a case where a crane is disassembled into a plurality of components, and then the plurality of components are assembled again. As a result, a part of a pipe of a hydraulic circuit is removed from a connecting portion and then the part of pipe is connected to the connecting portion. When the pipe of the hydraulic circuit is attached to or is detached from the connecting portion in this manner, there is a possibility that air is mixed into the hydraulic circuit. When air is mixed into the hydraulic circuit, for example, in case of a winch device provided with a wet brake such as the brake device disclosed in Patent Literature 1, there is a possibility that responsiveness of a brake is lowered. As a specific example, the following case is considered.

For example, to facilitate the transportation of a crane, there may be a case where a member such as a boom is removed from an upper slewing body. However, for example, when a winch drum is supported by a boom as in the case of a winch drum disclosed in Patent Literature 2, a pipe of the hydraulic circuit is disposed in a straddling manner over the upper slewing body and the boom. Accordingly, to remove the boom from the upper slewing body, it is necessary to remove a part of the pipe of the hydraulic circuit from the connecting portion. Then, after the crane is transported, the removed member such as the boom is attached to the upper slewing body again, and the removed pipe of the hydraulic circuit is connected to the connecting portion again. When the pipe of the hydraulic circuit is attached to or is detached from the connecting portion in this manner, there is a possibility that air is mixed into the hydraulic circuit. When air is mixed into the hydraulic circuit in this manner, a delay occurs in a change of a pressure of the working oil in the hydraulic circuit that applies braking to the winch drum. Accordingly, the responsiveness of the brake is lowered. Accordingly, in order to prevent such lowering of responsiveness of the brake, it is necessary to appropriately remove air mixed in the hydraulic circuit.

SUMMARY OF INVENTION

The present invention has been made in view of the above problems, and it is an object of the present invention to provide a work machine capable of effectively discharging air from the inside of a hydraulic circuit of a winch unit capable of applying braking to a winch drum by receiving a hydraulic force.

According the present invention, there is provided a work machine that includes: a machine body; a winch unit detachably attached to the machine body, the winch unit including: a winch drum configured to wind and unwind a rope; a winch motor configured to rotate the winch drum; a clutch portion being switchable between a clutch-on state and a clutch-off state, the clutch portion configured to allow power of the winch motor to be transmitted to the winch drum while applying braking to the winch drum in the clutch-on state, the clutch portion configured to disconnect the winch drum from the winch motor so as to allow the winch drum to freely rotate with respect to the winch motor in the clutch-off state; and a cylinder portion connected to the clutch portion, and having a positive oil chamber that generates a force in a direction that the clutch portion is brought into the clutch-on state by receiving a hydraulic force and a negative oil chamber that generates a force in a direction that the clutch portion is brought into the clutch-off state by receiving a hydraulic force; a hydraulic source attached to the machine body and being capable of discharging working oil; a braking operation unit configured to receive an operation for applying braking to the winch drum, an operation amount that the braking operation unit receives being variable; a first main oil passage that makes a specified oil chamber that is one of the positive oil chamber and the negative oil chamber communicate with the hydraulic source thus allowing a working oil to flow into the specified oil chamber; a brake valve disposed in the first main oil passage between the specified oil chamber and the hydraulic source, the brake valve being capable of adjusting a brake force applied to the winch drum in the clutch-on state by generating a differential pressure between the positive oil chamber and the negative oil chamber by adjusting a hydraulic force supplied to the specified oil chamber through the first main oil passage corresponding to an operation amount that the braking operation unit receives; a connecting portion configured to selectively disconnect and connect a portion of the first main oil passage between the hydraulic source and the specified oil chamber of the cylinder portion along with mounting and dismounting of the winch unit to and from the machine body; a sub oil passage provided independently from the first main oil passage, the sub oil passage making the specified oil chamber and a low-pressure container having a pressure that is lower than a pressure of the specified oil chamber communicate with each other; and a throttle portion disposed in the sub oil passage and configured to generate a differential pressure in the sub oil passage between an upstream side and a downstream side of the throttle portion, the throttle portion including an opening that has an opening diameter that generates a brake pressure in the specified oil chamber and allows the working oil to flow from the specified oil chamber toward the low-pressure container.

DESCRIPTION OF EMBODIMENTS

Figure 1:
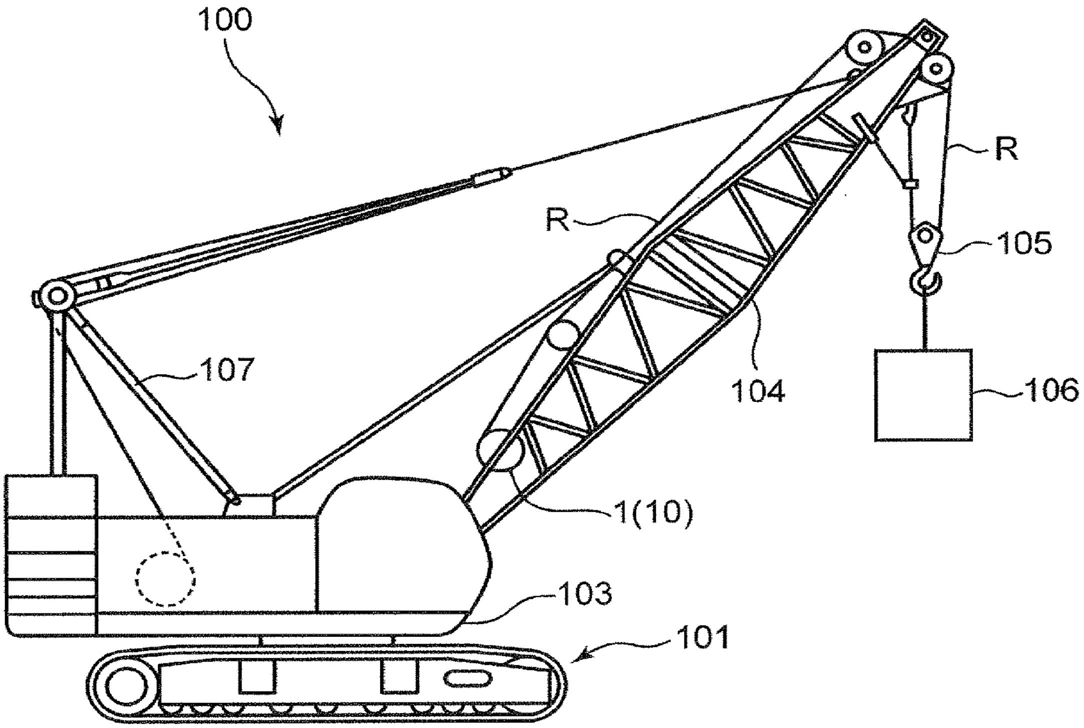
FIG. 1 is a side view illustrating a work machine according to various embodiments of the present invention.

Hereinafter, embodiments of the present invention are described with reference to the drawings. FIG. 1 is a side view illustrating a crane 100 (a work machine) according to an embodiment of the present invention. As shown in FIG. 1, a crane 100 includes: a lower travelling body 101 capable of performing self-travelling; an upper slewing body 103 (machine body) mounted on the lower travelling body 101 in a slewable manner, a boom 104 mounted on the upper slewing body 103 in such a manner that a boom 104 can be raised or lowered; a hook 105 suspended from a distal end of the boom 104 by way of a rope R; a gantry 107 mounted on the upper slewing body 103; and a winch device 10 (winch unit) having a winch drum 1. When the jib is mounted on the distal end of the boom 104, the hook 105 is suspended from the distal end of the jib by way of the rope R.

The winch device 10 is provided for lifting and lowering the hook 105 to make the hook 105 perform a lifting operation. The winch device 10 performs the lifting and lowering operation by winding the rope R connected to the hook 105 around the winch drum 1 or unwinding the rope R from the winch drum 1. The rope R is unwound from the winch drum 1, passes through the distal end of the boom 104, and is suspended from the distal end of the boom 104 to hang the hook 105. A lifting load 106 is hung from the hook 105. The winch drum 1 rotates in one rotation direction (winding rotation direction) around its rotation axis to wind up the rope R thus raising the hook 105. The winch drum 1 unwinds the rope R by rotating in the direction opposite to the winding rotation direction thus lowering the hook 105.

As illustrated in FIG. 1, in this embodiment, the winch drum 1 is mounted on the boom 104. The winch drum 1 is supported on the boom 104 in a state where the rotation axis of the winch drum 1 agrees with a vehicle width direction of the crane 100. Although not illustrated in FIG. 1, in the crane 100, a portion of a pipe of a hydraulic circuit of the winch device 10 is arranged in a straddling manner over the upper slewing body 103 and the boom 104.

In this embodiment, hydraulic pipes connected to a wet-type brake unit 2 (see FIG. 2) or the like of the winch device 10 is detachably connected to a connecting portion using a detachable coupler (quick coupler) as described later. Accordingly, in removing the boom 104 from the upper slewing body 103 for transporting the crane 100, the winch drum 1 that is supported on the boom 104 can be easily separated from the upper slewing body 103 together with some hydraulic pipes. Particularly, it is preferable that all hydraulic pipes connected to the winch device 10 be connected by detachable couplers.

Figure 2:
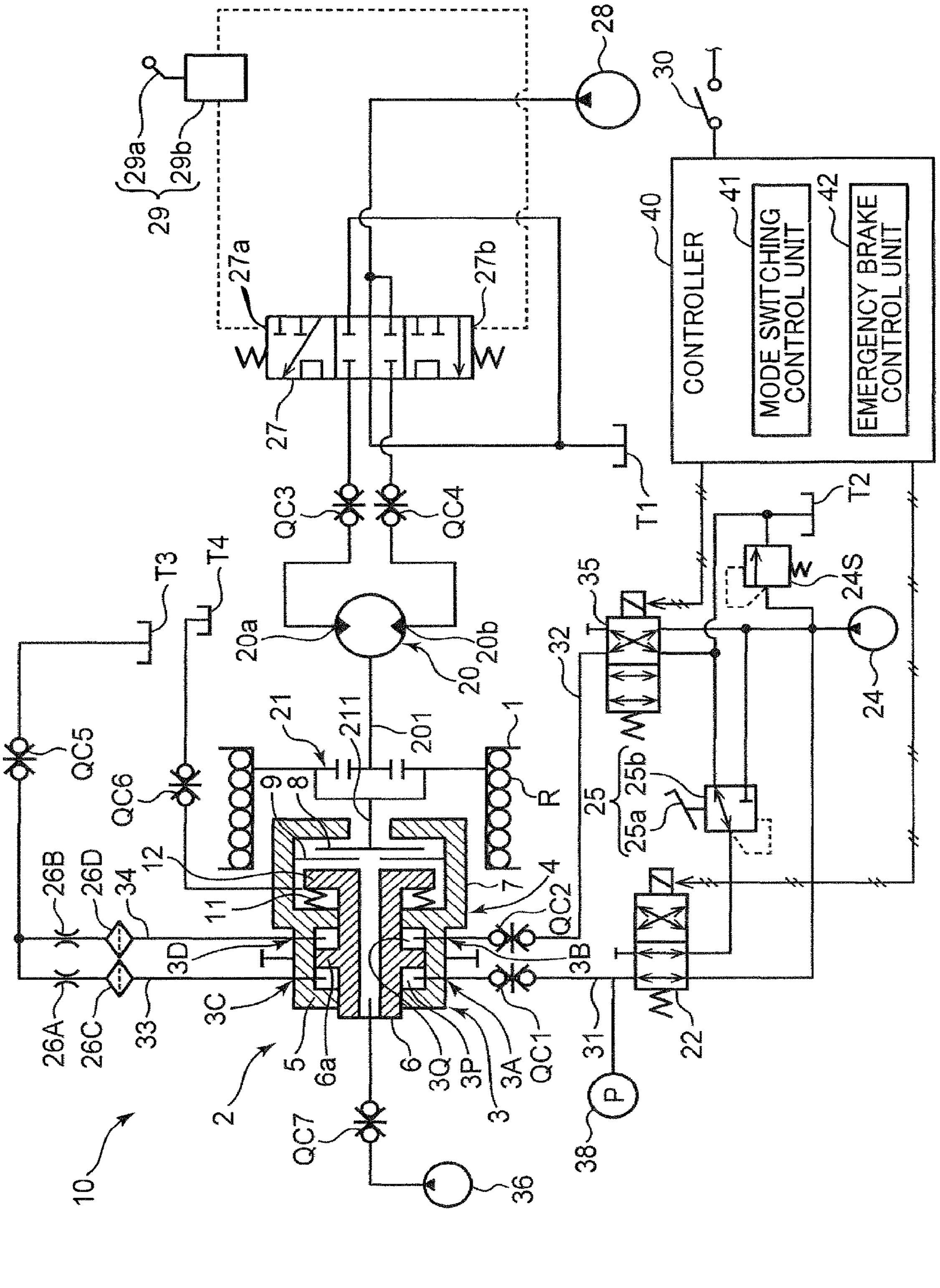
FIG. 2 is a diagram illustrating a hydraulic circuit mounted on a work machine according to a first embodiment of the present invention.

Hereinafter, the crane 100 according to the embodiments of the present invention is described in further detail. FIG. 2 is a view illustrating a hydraulic circuit in the crane 100 according to a first embodiment of the present invention. As illustrated in FIG. 2, the winch device 10 of the crane 100 includes a winch motor 20, a speed reduction device 21, and a wet-type brake unit 2 besides the above-mentioned winch drum 1.

The crane 100 also includes: a mode switching valve 22, a hydraulic pump 24 that is mounted on the machine body and forms a hydraulic source capable of discharging a working oil; a braking operation device 25; a first throttle 26A; a second throttle 26B; a first filter 26C; a second filter 26D; a rotation-direction switching valve 27; a hydraulic pump 28; a winch operation device 29; a mode switching switch 30; a first positive line 31; a first negative line 32; a second positive line 33; a second negative line 34; an emergency brake valve 35; a cooling oil pump 36; a pressure gauge 38; and a controller 40. On the crane 100, a first tank T1, a second tank T2, a third tank T3, and a fourth tank T4 are disposed. These tanks store oil respectively. These tanks may be formed of the same tank or may be formed of different tanks. Some tanks may form a common tank.

The winch motor 20 is a drive source for rotatably driving the winch drum 1. In this embodiment, the winch motor 20 is a hydraulic motor having an output shaft 201 that is rotated with the supply of a working oil from the hydraulic pump 28. The winch motor 20 has a first port 20*a* and a second port 20*b*. When a working oil is supplied to one of these ports, the output shaft 201 is rotated in the direction corresponding to such one port, and the working oil is discharged from the other port.

The rotation-direction switching valve 27 is interposed between the hydraulic pump 28 and the winch motor 20. The rotation-direction switching valve 27 is a control valve that controls the direction of the working oil supplied to the winch motor 20 by selectively guiding the working oil for driving the winch motor 20 from the hydraulic pump 28 to the first port 20*a* and the second port 20*b* of the winch motor 20, and controls a flow rate of the working oil supplied to the winch motor 20. The rotation-direction switching valve 27 has pilot ports 27*a*, 27*b*.

The winch operation device 29 has an operation lever 29*a* as operation member and a pilot valve 29*b*. When an operation is given to the operation lever 29*a* from an operator, the operation lever 29*a* is rotated in the direction that the operation is given. The pilot valve 29*b* has an inlet port connected to a pilot pump and a pair of outlet ports. The illustration of the inlet ports and the outlet ports is omitted. The pair of outlet ports is connected to pilot ports 27*a*, 27*b* of the rotation-direction switching valve 27 respectively through pilot lines. The pilot valve 29*h* is opened so as to allow the supply of a pilot pressure that corresponds to a magnitude of an operation of the operation lever 29*a* to the pilot ports 27*a*, 27*b* that correspond to the direction of the operation of the operation lever 29*a* from a pilot pump.

The rotation-direction switching valve 27 is held at a neutral position (a center position in FIG. 2) when a pilot pressure is not inputted to the pilot ports 27*a*, 27*h*. At such a neutral position, a hydraulic passage between the hydraulic pump 28 and the winch motor 20 is shut off and a center bypass line is opened. As a result, a working oil from the hydraulic pump 28 directly returns to the first tank T1 through the center bypass line.

When a predetermined or more pilot pressure is supplied to the pilot port 27*a*, the rotation-direction switching valve 27 shifts from the above-mentioned neutral position to a first drive position (a position illustrated on an upper side in FIG. 2) at a stroke that corresponds to a magnitude of the pilot pressure. At the first drive position, a working oil from the hydraulic pump 28 is supplied to the first port 20*a* of the winch motor 20 at a flow rate that corresponds to the stroke, and a working oil discharged from the second port 20*b* returns to the first tank T1.

When a predetermined or more pilot pressure is supplied to the pilot port 27*b*, the rotation-direction switching valve 27 shifts from the above-mentioned neutral position to a second drive position (a position illustrated on a lower side in FIG. 2) at a stroke that corresponds to a magnitude of the pilot pressure. At the second drive position, a working oil from the hydraulic pump 28 is supplied to the second port 20*b* of the winch motor 20 at a flow rate that corresponds to the stroke, and a working oil discharged from the first port 20*a* returns to the first tank T1.

The speed reduction device 21 is interposed between an output shaft 201 of the winch motor 20 and the winch drum 1. The speed reduction device 21 is provided for transmitting power of the winch motor 20 to the winch drum 1. The speed reduction device 21 is formed of a planetary gear mechanism, for example. A plate (for example, an inner plate 8) of a clutch portion 4 described later is connected to a carrier shaft 211 of the speed reduction device 21.

The wet-type brake unit 2 has a cylinder portion 3 and the clutch portion 4. The clutch portion 4 can be switched between a clutch-on state and a clutch-off state by the cylinder portion 3. In the clutch-on state, the clutch portion 4 allows the transmission of power of the winch motor 20 to the winch drum 1 while applying braking to the winch drum 1. In the clutch-off state, the clutch portion 4 allows the free rotation of the winch drum 1 relative to the winch motor 20 by disconnecting the winch drum 1 from the winch motor 20.

The clutch portion 4 includes a clutch case 7, an inner plate 8 disposed in the clutch case 7, an outer plate 9, a spring 11, and a pressing portion 12.

The cylinder portion 3 is connected to the clutch portion 4. The cylinder portion 3 has: a positive oil chamber 3P that generates a force in a direction that brings the clutch portion 4 into the above-mentioned clutch-on state by receiving a working oil into the positive oil chamber 3P and by receiving a hydraulic force from the working oil; and a negative oil chamber 3Q that generates a force in a direction which brings the clutch portion 4 into the above-mentioned clutch off state by receiving the working oil in the negative oil chamber 3Q and by receiving a hydraulic force from the working oil. The cylinder portion 3 has: a cylinder case 5; and a piston 6 that is disposed in the cylinder case 5 and is movable relative to the cylinder case 5 in an axial direction. The piston 6 has a flange portion 6*a* that partitions a space in the cylinder case 5 into the positive oil chamber 3P and the negative oil chamber 3Q.

When the piston 6 moves in the axial direction in the cylinder case 5, the clutch portion 4 is switched between the above-mentioned clutch-on state (a state where braking is applied) and the above-mentioned clutch-off state (a state where braking is released). Specifically, along with the movement of the piston 6 in one direction of the axial direction, the pressing portion 12 applies a pressing force to the inner plate 8 and the outer plate 9 such that the inner plate 8 and the outer plate 9 slide with lubricating oil. As a result, the clutch portion 4 is brought into a clutch-on state. On the other hand, when the piston 6 moves in the other direction opposite to the above-mentioned one direction of the axial direction, the inner plate 8 and the outer plate 9 are spaced apart from each other so that the clutch portion 4 is brought into a clutch-off state. The spring 11 biases the pressing portion 12, that is, the piston 6 in the direction the clutch portion 4 is brought into a clutch-on state.

The first positive line 31 (first main oil passage) allows the positive oil chamber 3P (specified oil chamber) and the hydraulic pump 24 to communicate with each other thus allowing a working oil to flow between the positive oil chamber 3P and the hydraulic pump 24. A working oil discharged from the hydraulic pump 24 is supplied from the first positive line 31 to the positive oil chamber 3P through the mode switching valve 22. The working oil discharged from the positive oil chamber 3P is discharged to the second tank T2 through the mode switching valve 22 and the braking operation device 25. When a pressure in the discharge line of the hydraulic pump 24 exceeds a predetermined value, a part of a working oil is discharged from a relief valve 24S to the second tank T2.

The first negative line 32 allows the negative oil chamber 3Q and the hydraulic pump 24 and the second tank T2 to communicate with each other, and allows a working oil to flow between the negative oil chamber 3Q and the hydraulic pump 24 and the second tank T2. A working oil discharged from the hydraulic pump 24 is supplied from the first negative line 32 to the negative oil chamber 3Q through the emergency brake valve 35. The working oil discharged from the negative oil chamber 3Q is discharged to the second tank T2 through the first negative line 32 and the emergency brake valve 35.

The second positive line 33 (sub oil passage) allows the positive oil chamber 3P and the third tank T3 (low-pressure container) having a pressure (for example, an atmospheric pressure) set lower than a pressure in the positive oil chamber 3P to communicate each other, and allows a working oil to flow between the positive oil chamber 3P and the third tank T3. In the same manner, the second negative line 34 allows the negative oil chamber 3Q and the third tank T3 to communicate with each other, and allows the working oil to flow between the negative oil chamber 3Q and the third tank T3.

The cylinder portion 3 has: a supply/discharge port 3A (receiving port) that receives a working oil from the first positive line 31 to the positive oil chamber 3P, and discharges the working oil from the positive oil chamber 3P to the first positive line 31; a supply/discharge port 3B (receiving port) that receives a working oil from the first negative line 32 to the negative oil chamber 3Q, and discharges a working oil from the negative oil chamber 3Q to the first negative line 32; a discharge port 3C (discharge port) that discharges a working oil from the positive oil chamber 3P to the second positive line 33; and a discharge port 3D (discharge port) that discharges a working oil from the negative oil chamber 3Q to the second negative line 34. The discharge port 3C of the cylinder portion 3 is disposed at a higher position (above) than the supply/discharge port 3A, and the discharge port 3D is disposed at a position higher than the supply/discharge port 3B.

The mode switching valve 22 is a control valve for changing over the clutch portion 4 between a clutch-on state (braking state) and a clutch-off state (braking release state) in cooperation with the braking operation device 25. The mode switching valve 22 is interposed between the hydraulic pump 24 and the positive oil chamber 3P.

The mode switching valve 22 is configured to change over the valve position between a supply position (a left side position in FIG. 2) that allows the supply of a working oil from the hydraulic pump 24 to the positive oil chamber 3P and an a discharge position (a right side position in FIG. 2) that allows the discharge of the working oil in the positive oil chamber 3P from the positive oil chamber 3P. In this embodiment, the mode switching valve 22 is formed of an electromagnetic valve.

The mode switching switch 30 is a switch for changing over a braking operation mode between a braking mode and a free-fall mode. The mode switching switch 30 is configured to be operable by an operator by disposing the mode switching switch 30 in a cab of the crane 100, for example. The mode switching switch 30 is configured to input a free-fall mode signal to the controller 40 when the switch is turned on. The mode switching switch 30 is also configured to input a braking mode signal to the controller 40 when the switch is turned off.

When the mode switching switch 30 is turned off, a command signal (an excitation current) is not inputted to a solenoid of the mode switching valve 22 from the mode switching control unit 41 of the controller 40. Accordingly, the above-mentioned solenoid is brought into a non-excited state and hence, the mode switching valve 22 is switched from the discharge position to the supply position (the left side position in FIG. 2). When the mode switching valve 22 is switched from the discharge position to the supply position, the mode switching valve 22 allows the supply of a working oil from the hydraulic pump 24 to the positive oil chamber 3P. On the other hand, when the mode switching switch 30 is turned on, a command signal is inputted from the mode switching control unit 41 of the controller 40 to the solenoid of the mode switching valve 22. Accordingly, the solenoid is brought into an excitation state and hence, the mode switching valve 22 is switched from the supply position to the discharge position (the right side position in FIG. 2). When the mode switching valve 22 is switched from the supply position to the discharge position, the mode switching valve 22 allows the supply of a working oil from the hydraulic pump 24 to the positive oil chamber 3P corresponding to an operation amount that the operation pedal 25*a* receives. Alternatively, the mode switching valve 22 allows the working oil in the positive oil chamber 3P to return to the second tank T2 through the brake valve 25*b* of the braking operation device 25.

The braking operation device 25 has the operation pedal (foot pedal) 25*a* that forms an operation member (braking operation unit), and a brake valve 25*b*. The brake valve 25*b* is operated by the operation pedal 25*a*. The operation pedal 25*a* is a member that receives an operation for applying braking to the winch drum 1, and an operation amount that the operation pedal 25*a* receives is variable.

The first positive line 31 connected to the supply/discharge port 3A of the positive oil chamber 3P is connected to one outlet port of the mode switching valve 22. One inlet port of the mode switching valve 22 is connected to the hydraulic pump 24, and the other inlet port is connected to an outlet port of the brake valve 25*b*. One inlet port of the brake valve 25*b* is connected to the second tank T2, and the other inlet port of the brake valve 25*b* is connected to the hydraulic pump 24. The first negative line 32 that is connected to the supply/discharge port 3B of the negative oil chamber 3Q is connected to one outlet port of the emergency brake valve 35. One inlet port of the emergency brake valve 35 is connected to the second tank T2. The other inlet port of the emergency brake valve 35 is directly connected to the hydraulic pump 24.

When the operation pedal 25*a* is not operated, in a case where the mode switching switch 30 is in an ON state (the mode switching valve 22 being at the discharge position (the right side position in FIG. 2)), the brake valve 25*h* allows a working oil in the positive oil chamber 3P in the cylinder portion 3 to return to the second tank T2 through the mode switching valve 22. On the other hand, when the operation pedal 25*a* is operated in a case where the mode switching switch 30 is in the ON state (the mode switching valve 22 being at the discharge position), the brake valve 25*b* opens corresponding to a stroke of the operation pedal 25*a* thus allowing the supply of a working oil from the hydraulic pump 24 to the positive oil chamber 3P in the cylinder portion 3 through the mode switching valve 22. Alternatively, the brake valve 25*b* allows a working oil in the positive oil chamber 3P in the cylinder portion 3 to return to the second tank T2 through the mode switching valve 22.

The emergency brake valve 35 is configured to be switched between the supply position (the right side position in FIG. 2) that allows the supply of a working oil from the hydraulic pump 24 to the negative oil chamber 3Q, and the discharge position (the left side position in FIG. 2) that allows the discharge of the working oil in the negative oil chamber 3Q from the negative oil chamber 3Q to the second tank T2. In this embodiment, the emergency brake valve 35 is formed of an electromagnetic valve.

The first throttle 26A (throttle portion) is disposed on the second positive line 33. The first throttle 26A generates a differential pressure between an upstream side and a downstream side of the first throttle 26A. The first throttle 26A has an opening having an opening diameter that is set such that a pressure in the positive oil chamber 3P is held so as to generate a brake force applied to the winch drum 1 by the differential pressure between the positive oil chamber 3P and the negative oil chamber 3Q, and the working oil flows toward the third tank T3 from the positive oil chamber 3P. In other words, the first throttle 26A generates the flow of the working oil from the cylinder portion 3 to the third tank T3 while generating a braking pressure to the winch drum 1 in the cylinder portion 3. In the same manner, the second throttle 26B is disposed on the second negative line 34. The second throttle 26B generates a differential pressure between an upstream side and a downstream side of the second throttle 26B. The second throttle 26B has an opening having an opening diameter that is set such that a pressure in the negative oil chamber 3Q is held so as to generate a brake force applied to the winch drum 1 by the differential pressure between the positive oil chamber 3P and the negative oil chamber 3Q and the working oil flows toward the third tank T3 from the negative oil chamber 3Q.

The first filter 26C (filter) is disposed on the second positive line 33 on an upstream side of the first throttle 26A, and has meshes smaller than the opening of the first throttle 26A. In the same manner, a second filter 26D is disposed on the second negative line 34 on an upstream side of the second throttle 26B, and has meshes smaller than the opening of the second throttle 26B. The first filter 26C and the second filter 26D have a function of catching foreign matter or the like in a working oil that flows through the second positive line 33 and the second negative line 34 from the cylinder portion 3.

To prevent seizure of the clutch portion 4 due to friction generated between the inner plate 8 and the outer plate 9, as illustrated in FIG. 2, the winch device 10 further includes a cooling oil pump 36 that supplies cooling oil. The cooling oil from the cooling oil pump 36 is supplied to the clutch case 7 of the clutch portion 4 through, for example, a flow passage formed in the piston 6, and cools the inner plate 8 and the outer plate 9. After cooling the inner plate 8 and the outer plate 9, the cooling oil is collected in the fourth tank T4.

The controller 40 is formed of a Central Processing Unit (CPU), a Read Only Memory (ROM) that stores various control programs, a Random Access Memory (RAM) which is used as a working area of the CPU and the like.

In this embodiment, the controller 40 includes the mode switching control unit 41, and an emergency braking control unit 42 as its functions. The mode switching control unit 41 controls an operation of the mode switching valve 22. The emergency braking control unit 42 controls an operation of the emergency brake valve 35. As described later, unless the emergency braking control unit 42 performs an emergency braking operation of the emergency brake valve 35, an excitation current is inputted to the solenoid of the emergency brake valve 35 from the emergency braking control unit 42. Accordingly, the emergency brake valve 35 is always set at the supply position disposed on the right side in FIG. 2.

The winch device 10 according to the embodiment described above performs following operations. As illustrated in FIG. 2, when the mode switching switch 30 is turned off and the winch device 10 is switched to a braking mode state, the solenoid of the mode switching valve 22 is brought into a non-excitation state by the mode switching control unit 41 so that mode switching valve 22 is switched from the discharge position to the supply position (left side position in FIG. 2). In this case, the positive oil chamber 3P and the negative oil chamber 3Q receive a working oil from the hydraulic pump 24 and hence, the same pressure is applied to the positive oil chamber 3P and the negative oil chamber 3Q. Accordingly, due to a biasing force of the spring 11, the pressing portion 12 applies a pressing force to the inner plate 8 and the outer plate 9 such that the inner plate 8 and the outer plate 9 are brought into contact with each other. With such an operation, a state (a clutch-on state, a braking state) where the winch drum 1 and the winch motor 20 are connected with each other by way of the speed reduction device 21 is brought about.

On the other hand, when the mode switching switch 30 is turned on and the winch device 10 is switched to a free fall mode state, the solenoid of the mode switching valve 22 is brought into an excitation state by the mode switching control unit 41 so that the mode switching valve 22 is switched from the supply position to the discharge position (right side position in FIG. 2). Accordingly, the positive oil chamber 3P is connected to the brake valve 25*b* of the braking operation device 25. In this case, when the operation pedal 25*a* is operated at a maximum operation amount (when a step-in amount of the operation pedal 25*a* is maximum), the same pressure is applied to the positive oil chamber 3P and the negative oil chamber 3Q in the same manner as the case where the mode switching valve 22 is set at the supply position. Accordingly, a state (a braking state) is brought about where the winch drum 1 and the winch motor 20 are connected to each other by way of the speed reduction device 21.

On the other hand, when the operation pedal 25*a* is not operated at all (when the operation pedal 25*a* is not stepped on), a working oil in the positive oil chamber 3P is discharged to the second tank T2, while the working oil is supplied from the hydraulic pump 24 to the negative oil chamber 3Q. Therefore, the pressure in the positive oil chamber 3P becomes lower than the pressure in the negative oil chamber 3Q, and the pressure in the negative oil chamber 3Q becomes larger than a biasing force of the spring 11. Accordingly, a state (a clutch-off state, a brake release state) is brought about where the inner plate 8 and the outer plate 9 are spaced apart from each other. As a result, the winch drum 1 is brought into a free state where the winch drum 1 is disconnected from the winch motor 20. When the winch drum 1 is brought into a free state, the lifting load 106 freely falls due to its own weight.

When the operation pedal 25*a* is operated with an operation amount smaller than the maximum operation amount described above, that is, when the operation pedal 25*a* is operated in a state between the brake state and the brake release state described above, a pressure that corresponds to such an operation amount is applied to the positive oil chamber 3P by the brake valve 25*b*. As a result, by taking a balance between the pressure in the positive oil chamber 3P, the pressure in the negative oil chamber 3Q, and a biasing force of the spring 11, a state where the winch drum 1 and the winch motor 20 are connected by way of the speed reduction device 21 is acquired while applying a predetermined brake force to the winch drum 1. Therefore, a free-fall speed of the lifting load 106 is increased or decreased corresponding to an operation amount (step-in amount) of the operation pedal 25*a*. In this case, it is possible to change a brake force applied to the winch drum 1 by adjusting a face pressure between the inner plate 8 and the outer plate 9. That is, when an output of the brake valve 25*b* becomes a high pressure, strong braking is applied to the winch drum 1. On the other hand, when the output of the brake valve 25*b* becomes low pressure, the braking applied to the winch drum 1 becomes weak.

As described above, in the present embodiment, the brake valve 25*b* of the braking operation device 25 is disposed between the positive oil chamber 3P and the hydraulic pump 24 in the first positive line 31. The brake valve 25*b* can adjust a brake force applied to the winch drum 1 in a clutch-on state (a brake state) by adjusting a hydraulic force supplied to the positive oil chamber 3P through the first positive line 31 corresponding to an operation amount that the operation pedal 25*a* receives, and by generating a differential pressure between the positive oil chamber 3P and the negative oil chamber 3Q.

The pressure gauge 38 detects a pressure in a portion of the first positive line 31 between the mode switching valve 22 and the positive oil chamber 3P of the cylinder portion 3, and inputs an output signal corresponding to the pressure to the controller 40. In a case where the mode switching control unit 41 sets the mode switching valve 22 to the discharge position on the right side in FIG. 2 in order to bring the operation mode into a clutch-off state (a brake release state) and the pressure gauge 38 detects a pressure smaller than a preset threshold pressure although the operation pedal 25*a* is operated with a predetermined operation amount, there is a possibility that a normal hydraulic force is not applied to the positive oil chamber 3P for some reason so that a free-fall speed of the lifting load 106 becomes too high. Accordingly, the emergency braking control unit 42 is provided. The emergency braking control unit 42 releases inputting of an excitation current (a command signal) to the solenoid of the emergency brake valve 35 when it is considered that the emergency braking is necessary in view of a command signal (excitation current) inputted from the mode switching control unit 41 to the solenoid of the mode switching valve 22, an operation amount that the operation pedal 25*a* receives, or a pressure that the pressure gauge 38 detects. In this case, the emergency brake valve 35 is switched to the discharge position on the left side in FIG. 2 and hence, the working oil in the negative oil chamber 3Q is forcibly discharged to the second tank T2. Accordingly, due to a biasing force of the spring 11, the pressing portion 12 applies a pressing force to the inner plate 8 and the outer plate 9 such that the inner plate 8 and the outer plate 9 are brought into contact with each other. With such an operation, a state (a clutch-on state, a braking state) where the winch drum 1 and the winch motor 20 are connected with each other by way of the speed reduction device 21 is brought about.

The crane 100 further includes: a first quick coupler QC1 (connecting portion); a second quick coupler QC2; a third quick coupler QC3; a fourth quick coupler QC4; a fifth quick coupler QC5; a sixth quick coupler QC6; and a seventh quick coupler QC7.

The first quick coupler QC1 can selectively disconnect and connect a portion of the first positive line 31 between the hydraulic pump 24 and the cylinder portion 3, more specifically, the portion of the first positive line 31 between the mode switching valve 22 and the cylinder portion 3. In the same manner, the second quick coupler QC2 can selectively disconnect and connect a portion of the first negative line 32 between the hydraulic pump 24 and the cylinder portion 3, more specifically, the portion of the first negative line 32 between the emergency brake valve 35 and the cylinder portion 3. The third quick coupler QC3 can selectively disconnect and connect a portion of an oil passage between the hydraulic pump 28 and the winch motor 20, more specifically the portion of the oil passage between the rotation-direction switching valve 27 and the first port 20*a* of the winch motor 20. The fourth quick coupler QC4 can selectively disconnect and connect a portion of an oil passage between the hydraulic pump 28 and the winch motor 20, more specifically the portion of the oil passage between the rotation-direction switching valve 27 and the second port 20*b* of the winch motor 20. The fifth quick coupler QC5 can selectively disconnect and connect a portion of the second positive line 33 (second negative line 34) between the first throttle 26A (second throttle 26B) and the third tank T3. The sixth quick coupler QC6 can selectively disconnect and connect a portion of a cooling oil passage between a cooling oil pump 36 that supplies a cooling oil and a fourth tank T4 that collects the cooling oil, more specifically the portion of the cooling oil passage between a clutch case 7 and the fourth tank T4. The seventh quick coupler QC7 can selectively disconnect and connect a portion of the above-mentioned cooling oil passage between the piston 6 and the cooling oil pump 36. The above-mentioned quick couplers can disconnect or connect the respective oil passages along with mounting of the winch device 10 on the boom 104 (upper slewing body 103) or the dismounting of the winch device 10 from the boom 104 (upper slewing body 103). Accordingly, the upper slewing body 103 and the winch device 10 can be transported independently from each other.

In the above-mentioned mounting and dismounting operation (insertion/removal operation) of the respective quick couplers, there is a concern that air is mixed into the oil passage on which the quick coupler is mounted. In the above-mentioned mounting and dismounting operation of the first quick coupler QC1 illustrated in FIG. 2, when air is mixed to the first positive line 31, the transfer of a hydraulic force to the positive oil chamber 3P corresponding to an operation amount that the operation pedal 25*a* of the braking operation device 25 receives is not smoothly performed. Accordingly, there may be a case where a delay occurs in a braking operation applied to the winch drum 1. Particularly, when a delay occurs in a braking operation applied to the winch drum 1 in a brake released state, there arises a drawback that a lifting load falls excessively beyond the intention of an operator. Further, when the difference is generated between an operation amount of the operation pedal 25*a* and an amount of braking applied to the winch drum 1, there arises a problem that an operator has poor operation feeling in the operation of the brake.

According to this embodiment, the second positive line 33 which makes the positive oil chamber 3P and the third tank T3 communicate with each other is provided, and the first throttle 26A is disposed on the second positive line 33. The opening of the first throttle 26A generates a gentle flow of the working oil from the positive oil chamber 3P toward the third tank T3. Further, the opening of the first throttle 26A generates a predetermined pressure for a braking operation applied to the winch drum 1 in the positive oil chamber 3P disposed on an upstream side of the first throttle 26A. Accordingly, even when air enters the positive oil chamber 3P from the first quick coupler QC1 through the first positive line 31, the air is discharged to the third tank T3 through the first throttle 26A of the second positive line 33. Accordingly, at the time of adjusting a hydraulic force in the positive oil chamber 3P by the brake valve 25*b*, a delay in a change in pressure in the cylinder portion 3 can be suppressed for an operation amount that the operation pedal 25*a* receives due to air in a working oil in the positive oil chamber 3P or in the first positive line 31. As a result, the operability of the braking operation of the winch drum 1 can be stably maintained.

In the embodiment, the first filter 26C is disposed on a portion of the second positive line 33 between the discharge port 3C of the cylinder portion 3 and the first throttle 26A. Accordingly, the first filter 26C collects foreign matter flowing from the cylinder portion 3 and prevents the opening of the first throttle 26A from being clogged by the foreign matter. As a result, air can be stably discharged from the positive oil chamber 3P to the third tank T3 side.

Further, in this embodiment, besides the second positive line 33, the second throttle 26B is disposed on the second negative line 34. Accordingly, even when air enters the negative oil chamber 3Q from the second quick coupler QC2 through the first negative line 32, the air is discharged to the third tank T3 through the second throttle 26B of the second negative line 34. Accordingly, at the time of adjusting a hydraulic force in the positive oil chamber 3P by the brake valve 25*b*, a delay in the movement of the piston 6 due to air in a working oil in the negative oil chamber 3Q or in the first negative line 32 can be suppressed. As a result, the operability of the braking operation of the winch drum 1 can be stably maintained. In addition, the second filter 26D is also disposed in the second negative line 34, foreign matter is prevented from entering the second throttle 26B from the cylinder portion 3, and the opening of the second throttle 26B is prevented from being clogged by the foreign matter. As a result, air can be stably discharged from the negative oil chamber 3Q to the third tank T3 side.

Further, in this embodiment, in the cylinder portion 3, the discharge port 3C is disposed at the position higher than the supply/discharge port 3A. Air mixed in the positive oil chamber 3P rises in a working oil in the positive oil chamber 3P and is liable to be accumulated in an upper portion in the positive oil chamber 3P. Accordingly, air accumulated in the upper portion of the inside of the positive oil chamber 3P can be efficiently discharged to the second positive line 33 together with a working oil through the discharge port 3C disposed at the position higher than the supply/discharge port 3A. In the same manner, also in the cylinder portion 3, the discharge port 3D is disposed at the position higher than the supply/discharge port 3B. Accordingly, air accumulated in the upper portion of the inside of the negative oil chamber 3Q can be efficiently discharged to the second negative line

34 together with a working oil through the discharge port 3D disposed at the position higher than the supply/discharge port 3B.

In this embodiment, the positive oil chamber 3P forms the specified oil chamber according to the present invention. The first negative line 32 (second main oil passage) allows the working oil discharged from the hydraulic pump 24 to flow into the negative oil chamber 3Q. The brake valve 25*b* is switchable between a non-brake position where the positive oil chamber 3P communicates with the second tank T2 when the operation pedal 25*a* is not operated so that a hydraulic force in the positive oil chamber 3P is made equal to a pressure in the tank and a brake position where the positive oil chamber 3P and the hydraulic pump 24 are made to communicate with each other when the operation pedal 25*a* receives an operation at a maximum operation amount so as to maximize a brake force of the hydraulic force. The brake valve 25*b* can further adjust a hydraulic force supplied to the positive oil chamber 3P between the non-brake position and the brake position corresponding to an operation amount that the operation pedal 25*a* receives. In this manner, in this embodiment, in the configuration where positive braking can be applied to the winch drum 1, air which is mixed in at least the first positive line 31 or the positive oil chamber 3P can be effectively discharged.

In this manner, a diameter of an opening of the first throttle 26A (second throttle 26B) is set so as to satisfy a condition that air is sufficiently removed from the positive oil chamber 3P (negative oil chamber 3Q), a condition that responsiveness of the braking operation is not deteriorated, and a condition that a primary pressure of the brake valve 25*b* for braking operation is not lowered. As an example, in the present embodiment, a diameter of the opening of each throttle is set in a range of 0.3 mm±0.1 mm. In FIG. 2, the second throttle 26B and the second filter 26 D arranged on the negative line 34 side are not necessarily arranged. The diameter of the opening of each throttle is not limited to the above-mentioned range, and may be determined in consideration of a flow rate of a working oil, pressures, a generation state of foreign matters in the hydraulic circuit, and the like. The diameter of the opening of each throttle may be adjusted in conformity with an actual hydraulic circuit.

Figure 3:
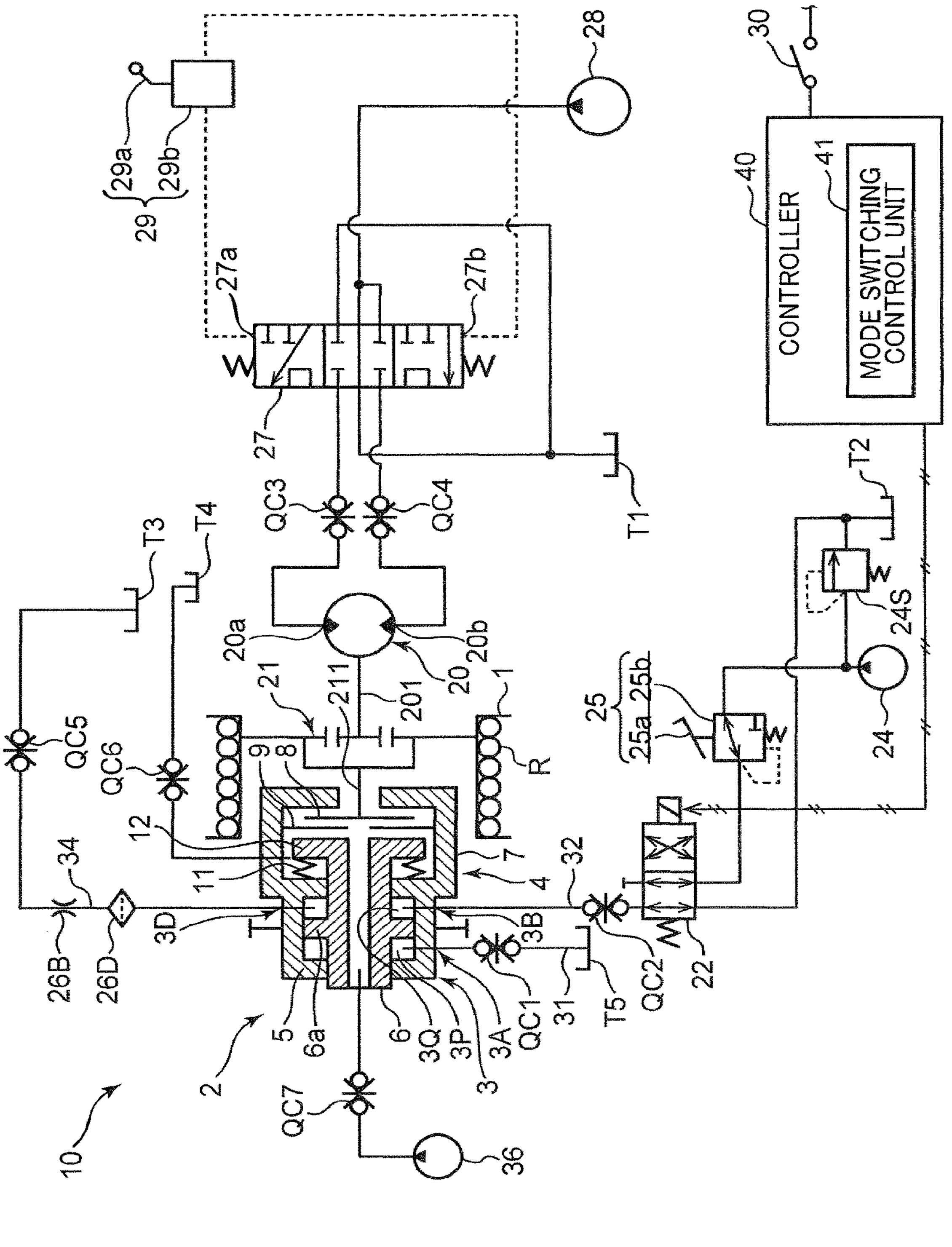
FIG. 3 is a diagram illustrating a hydraulic circuit mounted on a work machine according to a second embodiment of the present invention.

FIG. 3 is a view illustrating a hydraulic circuit in the crane 100 according to a second embodiment of the present invention. The hydraulic circuit of the crane 100 according to the second embodiment illustrated in FIG. 3 differs from the hydraulic circuit of the crane 100 according to the first embodiment illustrated in FIG. 2 with respect to the following points. However, other configurations are substantially equal to the corresponding configurations of the hydraulic circuit according to the first embodiment. Accordingly, only the points that make the hydraulic circuit according to this embodiment differ from the hydraulic circuit according to the first embodiment are described hereinafter.

In the hydraulic circuit according to the second embodiment, a first positive line 31 is connected to the supply/discharge port 3A of the positive oil chamber 3P of the cylinder portion 3. Unlike the first embodiment, the first positive line 31 is not connected to the mode switching valve 22 and the hydraulic pump 24. However, the first positive line 31 is connected to a fifth tank T5. The positive oil chamber 3P of the cylinder portion 3 does not include parts that correspond to the discharge port 3C and the second positive line 33 connected to the discharge port 3C in the first embodiment. The fifth tank T5 may also have the same configuration as other tanks. However, the fifth tank T5 may have the different configuration.

The first negative line 32 is connected to the supply/discharge port 3B of the negative oil chamber 3Q of the cylinder portion 3. Unlike the first embodiment, the first negative line 32 is not connected to the hydraulic pump 24 or the second tank T2 through the emergency brake valve 35. On the other hand, in the same manner as the first positive line 31 of the first embodiment, the first negative line 32 is connected to an outlet port of a mode switching valve 22 on one side. The inlet port of the mode switching valve 22 on one side is connected to the second tank T2. The other inlet port of the mode switching valve 22 is connected to the outlet port of the brake valve 25*b*. The port of the brake valve 25*b* on one side is connected to the hydraulic pump 24. The inlet port of the brake valve 25*b* on the other side is connected to a second tank T2.

The discharge port 3D of the negative oil chamber 3Q of the cylinder portion 3 communicates with a third tank T3 through the second negative line 34. In the same manner as the first embodiment, the second throttle 26B and the second filter 26D are disposed on the second negative line 34.

The winch device 10 (crane 100) according to the second embodiment described above performs the following operations. As illustrated in FIG. 3, when the mode switching switch 30 is turned off and the winch device 10 is switched to a braking mode state, a solenoid of the mode switching valve 22 is brought into a non-excitation state so that the mode switching valve 22 is switched from a supply position to a discharge position (left side position in FIG. 3). In this case, the equal pressure (a tank pressure released to an atmosphere) is applied to the positive oil chamber 3P and the negative oil chamber 3Q. Accordingly, because of a biasing force of a spring 11, a pressing portion 12 applies a pressing force to the inner plate 8 and the outer plate 9 such that the inner plate 8 and the outer plate 9 are brought into contact with each other. With such an operation, a state (a clutch-on state, a braking state) is brought about where the winch drum 1 and the winch motor 20 are connected with each other by way of a speed reduction device 21. When the piston 6 moves, the working oil is sucked up from the fifth tank T5 into the positive oil chamber 3P through the first positive line 31 and hence, the positive oil chamber 3P expands.

On the other hand, when the mode switching switch 30 is turned on so that the winch device 10 is switched to a free fall mode state, the solenoid of the mode switching valve 22 is brought into an excitation state by the mode switching control unit 41 and hence, the mode switching valve 22 is switched from a discharge position to a supply position (right side in FIG. 3) so that the negative oil chamber 3Q is connected to the brake valve 25*b* of the braking operation device 25. In this case, when the operation pedal 25*a* is operated at a maximum operation amount (when a step-in amount of the operation pedal 25*a* is maximum), the same pressure (atmospheric pressure) is applied to the positive oil chamber 3P and the negative oil chamber 3Q in the same manner as the case where the mode switching valve 22 is set at the supply position. Accordingly, a state (a braking state) is brought about where the winch drum 1 and the winch motor 20 are connected to each other by way of the speed reduction device 21.

On the other hand, when the operation pedal 25*a* is not operated at all (when the operation pedal 25*a* is not stepped in), the positive oil chamber 3P communicates with the fifth tank T5, and a working oil is supplied to the negative oil chamber 3Q from the hydraulic pump 24. Therefore, the pressure in the positive oil chamber 3P becomes lower than the pressure in the negative oil chamber 3Q, and the pressure in the negative oil chamber 3Q becomes larger than a biasing force of the spring 11. Accordingly, a state (a clutch-off state, a brake release state) is brought about where the inner plate 8 and the outer plate 9 are spaced apart from each other. As a result, the winch drum 1 is brought into a free state where the winch drum 1 is disconnected from the winch motor 20. When the winch drum 1 is brought into a free state, the lifting load 106 freely falls due to its own weight.

When the operation pedal 25*a* is operated with an operation amount smaller than the maximum operation amount described above, that is, when the operation pedal 25*a* is operated in a state between the brake state and the brake release state described above, the brake valve 25*b* of the braking operation device 25 adjusts a hydraulic force in the negative oil chamber 3Q. As a result, by taking a balance between the pressure in the positive oil chamber 3P, the pressure in the negative oil chamber 3Q, and a biasing force of the spring 11, a state where the winch drum 1 and the winch motor 20 are connected by way of the speed reduction device 21 is acquired while applying a predetermined brake force to the winch drum 1. In this case, it is possible to change a brake force applied to the winch drum 1 by adjusting a face pressure between the inner plate 8 and the outer plate 9. Therefore, a free-fall speed of the lifting load 106 is increased or decreased corresponding to an operation amount (step-in amount) of the operation pedal 25*a*. That is, when an output of the brake valve 25*b* becomes a low pressure, strong braking is applied to the winch drum 1. On the other hand, when the output of the brake valve 25*b* becomes a high pressure, the braking applied to the winch drum 1 becomes weak.

Also in this embodiment, the second negative line 34 which makes the negative oil chamber 3Q and the third tank T3 communicate with each other is provided, and the second throttle 26B is disposed on the second negative line 34. An opening of the second throttle 26B generates a gentle flow of a working oil from the negative oil chamber 3Q toward the third tank T3. Further, the opening of the second throttle 26B generates a predetermined pressure for a braking operation applied to the winch drum 1 in the negative oil chamber 3Q disposed on an upstream side of the second throttle 26B. Accordingly, even when air enters the negative oil chamber 3Q from the second quick coupler QC2 through the first negative line 32, the air is discharged to the third tank T3 through the second throttle 26B of the second negative line 34. Accordingly, at the time of adjusting an amount of a working oil in the negative oil chamber 3Q by the brake valve 25*b*, a delay in a change in pressure in the cylinder portion 3 can be suppressed for an operation amount that the operation pedal 25*a* receives due to air in a working oil in the negative oil chamber 3Q or in the first negative line 32. As a result, the operability of the braking operation of the winch drum 1 can be stably maintained.

Also in this embodiment, the second filter 26D is disposed on a portion of the second negative line 34 between the discharge port 3D of the cylinder portion 3 and the second throttle 26B. Accordingly, a foreign matter is prevented from entering the second throttle 26B from the cylinder portion 3, and the opening of the second throttle 26B is prevented from being blocked by the foreign matter. As a result, air can be stably discharged from the negative oil chamber 3Q to the third tank T3 side.

In this embodiment, the negative oil chamber 3Q forms the specified oil chamber according to the present invention. The hydraulic circuit of the crane 100 includes the first positive line 31 (tank oil passage) that makes the positive oil chamber 3P communicate with the fifth tank T5. The brake valve 25*b* is switchable between a non-brake position where the negative oil chamber 3Q communicates with the hydraulic pump 24 when the operation pedal 25*a* is not operated so that a hydraulic force in the negative oil chamber 3Q is made to become a pressure that minimizes a brake force and a brake position where the negative oil chamber 3Q and the second tank T2 are made to communicate with each other when the operation pedal 25*a* receives an operation at a maximum operation amount so that a hydraulic force in the negative oil chamber 3Q becomes equal to a pressure in the tank. The brake valve 25*b* can further adjust a hydraulic force in the negative oil chamber 3Q between the non-brake position and the brake position corresponding to an operation amount that the operation pedal 25*a* receives. In this manner, in this embodiment, in the configuration where negative braking can be applied to the winch drum 1, air which is mixed in the first negative line 32 or the negative oil chamber 3Q can be effectively discharged.

Figure 4:
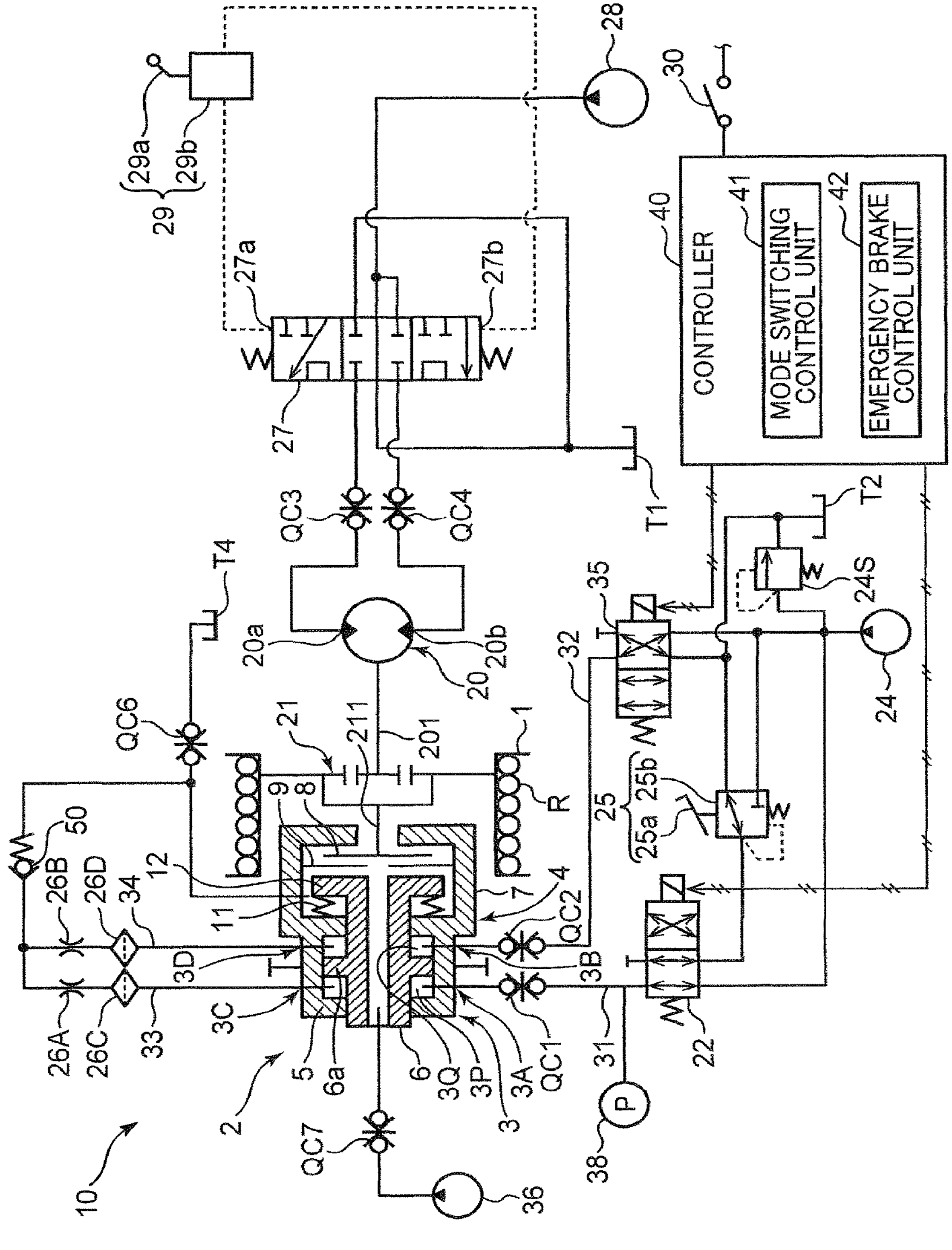
FIG. 4 is a diagram showing a hydraulic circuit mounted on a work machine according to a third embodiment of the present invention.

FIG. 4 is a view illustrating a hydraulic circuit in the crane 100 according to a third embodiment of the present invention. The hydraulic circuit of the crane 100 according to the third embodiment illustrated in FIG. 4 differs from the hydraulic circuit of the crane 100 according to the first embodiment illustrated in FIG. 2 with respect to the following points. However, other configurations are substantially equal to the corresponding configurations of the hydraulic circuit according to the first embodiment. Accordingly, only the points that make the hydraulic circuit according to this embodiment differ from the hydraulic circuit according to the first embodiment are described hereinafter.

In the hydraulic circuit according to the third embodiment, the second positive line 33 and the second negative line 34 merge with an oil passage for a cooling oil between the clutch case 7 and the fourth tank T4 unlike the third tank T3 of the first embodiment. The pressure in the fourth tank T4 is set to a pressure lower than the pressure in the positive oil chamber 3P. Also with such a configuration, the air mixed in the positive oil chamber 3P or the negative oil chamber 3Q is discharged toward the fourth tank T4 through the second positive line 33 or the second negative line 34. Accordingly, at the time of adjusting a hydraulic force in the positive oil chamber 3P by the brake valve 25*b*, a delay in a change in pressure in the cylinder portion 3 can be suppressed for an operation amount that the operation pedal 25*a* receives due to air in a working oil in the positive oil chamber 3P or in the first positive line 31. As a result, the operability of the braking operation of the winch drum 1 can be stably maintained. In addition, the movement of the piston 6 is prevented from being delayed by the air mixed in the negative oil chamber 3Q or the first negative line 32.

In the oil passage for cooling oil disposed between the cooling oil pump 36 and the fourth tank T4 (low-pressure container), the internal pressure of the oil passage may become higher than the atmospheric pressure (second tank T2) depending on a discharge flow rate of the cooling oil pump 36 and the pipe diameter. Therefore, in the present embodiment, the crane 100 includes a check valve 50. The check valve 50 is disposed in the second positive line 33 (second negative line 34) downstream of the first throttle 26A (second throttle 26B). Even when the pressure of the cooling oil passage is higher than the atmospheric pressure and the pressure of the fourth tank T4 is higher than the pressure of the positive oil chamber 3P when the braking applied to the winch drum 1 is released, the check valve 50 can prevent a working oil from flowing back from the fourth tank T4 toward the positive oil chamber 3P (negative oil chamber 3Q). As a result, it is possible to prevent the removed air from entering the positive oil chamber 3P or the negative oil chamber 3Q again. It is also possible to prevent the occurrence of a case where the first throttle 26A or the second throttle 26B is clogged by a foreign matter from the fourth tank T4 side.

The present invention is not limited to the embodiments described above. The present invention includes the following configurations, for example.

In the embodiments described above, the boom 104 is mounted on the upper slewing body 103, and the winch device 10 is detachably mounted on the boom 104. Accordingly, the winch device 10 can be detachably mounted on the upper slewing body 103 by way of the boom 104. However, the present invention is not limited to such a configuration. Even when the winch drum 1 is mounted on the upper slewing body 103, for example, in a situation where the winch drum 1 is disposed in the vicinity of a gantry 107 (see FIG. 1) or in the vicinity of a member such as a mast (not illustrated), there may be a case where, at the time of removing the gantry 107 or the mast from the upper slewing body 103, it is also necessary to remove the winch drum 1 from the upper slewing body because of reasons such as the restriction on spaces. Even in such a case, the winch devices 10 and the cranes 100 according to the respective embodiments can be used.

Further, the above-mentioned respective embodiments, the description has been with respect to the configuration where the first throttle 26A or the second throttle 26B is disposed between the cylinder portion 3 and the third tank T3 or the fourth tank T4. However, the present invention is not limited to such configuration. The discharge port 3C or the discharge port 3D may be formed on an outer wall of the cylinder portion 3 such that these ports communicate with the positive oil chamber 3P or the negative oil chamber 3Q, and the discharge port 3C or the discharge port 3D may function as throttle portions. In this case, a first filter 26C or a second filter 26D may be fixed to an inner peripheral surface of the cylinder portion 3 so as to prevent the discharge port 3C or the discharge port 3D from hindering the movement of the piston 6.

Further, in the third embodiment, the description has been made with respect to the configuration where the positive line 33 and the negative line 34 are merged between the cooling oil pump 36 and the fourth tank T4. However, as an alternative configuration, the positive line 33 and the negative line 34 may be merged in other oil passages such as a motor drain pipe.

According the present invention, there is provided a work machine that includes: a machine body; a winch unit detachably attached to the machine body, the winch unit including: a winch drum configured to wind and unwind a rope; a winch motor configured to rotate the winch drum; a clutch portion being switchable between a clutch-on state and a clutch-off state, the clutch portion configured to allow power of the winch motor to be transmitted to the winch drum while applying braking to the winch drum in the clutch-on state, the clutch portion configured to disconnect the winch drum from the winch motor so as to allow the winch drum to freely rotate with respect to the winch motor in the clutch-off state; and a cylinder portion connected to the clutch portion, and having a positive oil chamber that generates a force in a direction that the clutch portion is brought into the clutch-on state by receiving a hydraulic force and a negative oil chamber that generates a force in a direction that the clutch portion is brought into the clutch-off state by receiving a hydraulic force; a hydraulic source attached to the machine body and being capable of discharging working oil; a braking operation unit configured to receive an operation for applying braking to the winch drum, an operation amount that the braking operation unit receives being variable; a first main oil passage that makes a specified oil chamber that is one of the positive oil chamber and the negative oil chamber communicate with the hydraulic source thus allowing a working oil to flow into the specified oil chamber; a brake valve disposed in the first main oil passage between the specified oil chamber and the hydraulic source, the brake valve being capable of adjusting a brake force applied to the winch drum in the clutch-on state by generating a differential pressure between the positive oil chamber and the negative oil chamber by adjusting a hydraulic force supplied to the specified oil chamber through the first main oil passage corresponding to an operation amount that the braking operation unit receives; a connecting portion configured to selectively disconnect and connect a portion of the first main oil passage between the hydraulic source and the specified oil chamber of the cylinder portion along with mounting and dismounting of the winch unit to and from the machine body; a sub oil passage provided independently from the first main oil passage, the sub oil passage making the specified oil chamber and a low-pressure container having a pressure that is lower than a pressure of the specified oil chamber communicate with each other; and a throttle portion disposed in the sub oil passage and configured to generate a differential pressure in the sub oil passage between an upstream side and a downstream side of the throttle portion, the throttle portion including an opening that has an opening diameter that generates a brake pressure in the specified oil chamber and allows the working oil to flow from the specified oil chamber toward the low-pressure container.

According to this configuration, at the time of mounting the winch unit on the machine body or dismounting the winch from the machine body for various purposes (for example, the transportation of a crane), even when air is mixed into the first main oil passage from the connecting portion, the air can be effectively discharged from the cylinder portion so that it is possible to prevent lowering of responsiveness of the brake applied to the winch drum corresponding to an operation amount performed by a braking operation unit. Specifically, configurations are as follows. In the above-mentioned configuration, by switching the clutch portion between the clutch-on state and the clutch-off state, the connection between the winch drum and the winch motor is switched. Accordingly, winding and unwinding of a rope can be can be performed. In particular, in a clutch-on state, a brake force applied to the winch drum can be adjusted in such a manner that the brake valve adjusts a pressure that a specified oil chamber receives according to an operation amount that the braking operation unit receives, and generates a differential pressure between the positive oil chamber and the negative oil chamber. In dismounting such a winch unit from the machine body, the connecting portion disconnects the first main oil passage so at to disconnect a part of the hydraulic circuit. Further, in mounting the winch unit on the machine body, the connecting portion reconnects the first main oil passage so as to restore a part of the hydraulic circuit. Even when air is mixed into the hydraulic circuit from the connecting portion due to such mounting and dismounting operation of the winch unit, the throttle portion provided to the sub oil passage generates a differential pressure between the upstream side and the downstream side of the throttle portion, thus forming a flow of the working oil from the specified oil chamber toward the low-pressure container. Accordingly, air can be discharged from the specified oil chamber toward the low-pressure container. As a result, at the time of adjusting a hydraulic force in the specified oil chamber by the brake valve, a delay in a change in pressure in the cylinder portion can be suppressed for an operation amount that the braking operation unit receives due to air in a working oil. Accordingly, the operability of the braking operation of the winch drum can be stably maintained.

In the above configuration, it is desirable to further include a filter that is disposed on the upstream side of the throttle portion in the sub oil passage and that has meshes smaller than the opening of the throttle portion.

According to this configuration, the filter disposed on the upstream side of the throttle portion can collect a foreign matter flowing from the cylinder portion. Accordingly, it is possible to prevent the opening of the throttle portion from being clogged by the foreign matter. As a result, air can be stably discharged from the specified oil chamber toward the low-pressure container.

In the above configuration, it is preferable that the cylinder portion has: a receiving port configured to receive a working oil from the first main oil passage to the specified oil chamber; and a discharge port configured to discharge the working oil from the specified oil chamber to the sub oil passage, and the discharge port is disposed at a position higher than the receiving port.

With such a configuration, air in the specified oil chamber rises in a working oil in the specified oil chamber and is liable to be accumulated in an upper portion in the specified oil chamber. Accordingly, air accumulated in the upper portion in the specified oil chamber can be efficiently discharged to the sub oil passage together with a working oil through the discharge port disposed at the position higher than the receiving port.

In the above configuration, it is desirable to further include a check valve that is disposed on a downstream side of the throttle portion in the sub oil passage and that prevents the backflow of the working oil from the low-pressure container toward the specified oil chamber.

With such a configuration, even when the pressure in the low-pressure container may reach higher than the pressure in the specified oil chamber when the braking applied to the winch drum is released, it is possible to prevent a working oil from flowing back from the low-pressure container toward the specified oil chamber.

In the above configuration, the specified oil chamber may be the positive oil chamber and the work machine may further include a second main oil passage that allows a working oil discharged from the hydraulic source to flow into the negative oil chamber, and the brake valve may be switchable between a non-brake position at which the positive oil chamber and a tank are made to communicate with each other so as to set a hydraulic force in the positive oil chamber to a pressure equal to the pressure in the tank when the braking operation unit receives no operation and a brake position at which the positive oil chamber and the hydraulic source are made to communicate with each other so as to set a hydraulic force in the positive oil chamber to the pressure which maximizes the brake force when the braking operation unit receives an operation with the maximum operation amount. The brake valve may adjust the hydraulic force in the positive oil chamber between the non-brake position and the brake position according to the operation amount that braking operation unit receives. The specified oil chamber may be the negative oil chamber and the work machine may further include a tank oil passage that makes the positive oil chamber communicate with a tank, and the brake valve may be switchable between a non-brake position at which the negative oil chamber and the hydraulic source are made to communicate with each other so as to set a hydraulic force in the negative oil chamber to a pressure that minimizes a brake force when the braking operation unit receives no operation and a brake position at which the negative oil chamber and a tank are made to communicate with each other so as to set the hydraulic force in the negative oil chamber to a pressure equal to the pressure in the tank when the braking operation unit receives the operation with a maximum operation amount. The brake valve may adjust the hydraulic force in the negative oil chamber between the non-brake position and the brake position according to an operation amount that the braking operation unit receives.

The invention claimed is:

1. A work machine comprising:

a machine body;

a winch unit detachably attached to the machine body, the winch unit including:

a winch drum configured to wind and unwind a rope;

a winch motor configured to rotate the winch drum;

a clutch portion being switchable between a clutch-on state and a clutch-off state, the clutch portion configured to allow power of the winch motor to be transmitted to the winch drum while applying braking to the winch drum in the clutch-on state, the clutch portion configured to disconnect the winch drum from the winch motor so as to allow the winch drum to freely rotate with respect to the winch motor in the clutch-off state; and a cylinder portion connected to the clutch portion, and having a positive oil chamber that generates a force in a direction that the clutch portion is brought into the clutch-on state by receiving a hydraulic force and a negative oil chamber that generates a force in a direction that the clutch portion is brought into the clutch-off state by receiving a hydraulic force;

a hydraulic source attached to the machine body and being capable of discharging working oil;

a braking operation unit configured to receive an operation for applying braking to the winch drum, an operation amount that the braking operation unit receives being variable;

a first main oil passage that makes a specified oil chamber that is one of the positive oil chamber and the negative oil chamber communicate with the hydraulic source, thus allowing a working oil to flow into the specified oil chamber;

a brake valve disposed in the first main oil passage between the specified oil chamber and the hydraulic source, the brake valve being capable of adjusting a brake force applied to the winch drum in the clutch-on state by generating a differential pressure between the positive oil chamber and the negative oil chamber by adjusting a hydraulic force supplied to the specified oil chamber through the first main oil passage corresponding to an operation amount that the braking operation unit receives;

a connecting portion configured to selectively disconnect and connect a portion of the first main oil passage between the hydraulic source and the specified oil chamber of the cylinder portion along with mounting and dismounting of the winch unit to and from the machine body;

a sub oil passage provided independently from the first main oil passage, the sub oil passage making the specified oil chamber and a low-pressure container having a pressure that is lower than a pressure of the specified oil chamber communicate with each other; and a throttle portion disposed in the sub oil passage and configured to generate a differential pressure in the sub oil passage between an upstream side and a downstream side of the throttle portion, the throttle portion including an opening that has an opening diameter that generates a brake pressure in the specified oil chamber and allows the working oil to flow from the specified oil chamber toward the low-pressure container.

2. The work machine according to claim 1, further comprising a filter that is disposed on an upstream side of the throttle portion in the sub oil passage and that has a mesh smaller than the opening of the throttle portion.

3. The work machine according to claim 1, wherein the cylinder portion includes:

a receiving port configured to receive a working oil from the first main oil passage to the specified oil chamber; and a discharge port configured to discharge the working oil from the specified oil chamber to the sub oil passage, and the discharge port is disposed at a position higher than the receiving port.

4. The work machine according to claim 1, further comprising a check valve that is disposed on a downstream side of the throttle portion in the sub oil passage and that prevents a backflow of the working oil from the low-pressure container toward the specified oil chamber.

5. The work machine according to claim 1, wherein the specified oil chamber is the positive oil chamber, the work machine further comprises a second main oil passage that allows a working oil discharged from the hydraulic source to flow into the negative oil chamber, and the brake valve is switchable between a non-brake position at which the positive oil chamber and a tank are made to communicate with each other so as to set a hydraulic force in the positive oil chamber to a pressure equal to a pressure in the tank when the braking operation unit receives no operation and a brake position at which the positive oil chamber and the hydraulic source are made to communicate with each other so as to set a hydraulic force in the positive oil chamber to a pressure which maximizes a brake force when the braking operation unit receives an operation with a maximum operation amount, and the brake valve can adjust a hydraulic force in the positive oil chamber between the non-brake position and the brake position according to an operation amount that the braking operation unit receives.

6. The work machine according to claim 1, wherein the specified oil chamber is the negative oil chamber, the work machine further comprises a tank oil passage that makes the positive oil chamber communicate with a tank, the brake valve is switchable between a non-brake position at which the negative oil chamber and the hydraulic source are made to communicate with each other so as to set a hydraulic force in the negative oil chamber to a pressure that minimize a brake force when the braking operation unit receives no operation and a brake position at which the negative oil chamber and a tank are made to communicate with each other so as to set a hydraulic force in the negative oil chamber to a pressure equal to a pressure in the tank when the braking operation unit receives an operation with a maximum operation amount, and the brake valve can adjust the hydraulic force in the negative oil chamber between the non-brake position and the brake position according to an operation amount that the braking operation unit receives.

* * * * *